United States Patent

Kim

[11] Patent Number: 5,803,336
[45] Date of Patent: Sep. 8, 1998

[54] PINCH ROLLER TYPE TAPE DRIVE ASSEMBLY

[75] Inventor: Keum-Mo Kim, Seoul, Rep. of Korea

[73] Assignee: Daewoo Electronics Co., Ltd., Seoul, Rep. of Korea

[21] Appl. No.: 766,204

[22] Filed: Dec. 12, 1996

[30] Foreign Application Priority Data

Dec. 13, 1995 [KR] Rep. of Korea .................. 1995-40752

[51] Int. Cl.⁶ .............................. B65H 23/04; F16C 33/10
[52] U.S. Cl. ......................... 226/194; 226/186; 384/292; 384/220; 384/418
[58] Field of Search ................................... 226/181, 183, 226/186, 191, 194; 384/220, 292, 418; 474/94

[56] References Cited

U.S. PATENT DOCUMENTS

| | | |
|---|---|---|
| 1,923,514 | 8/1933 | Stockfleth .............................. 384/292 |
| 3,537,631 | 11/1970 | Fuji ......................................... 226/191 |
| 4,204,719 | 5/1980 | Murphy . | |
| 4,403,720 | 9/1983 | Grant .................... 226/194 X |
| 4,678,348 | 7/1987 | Tielemans et al. ................. 384/292 X |
| 4,770,550 | 9/1988 | Takahashi ............... 226/194 X |
| 5,452,833 | 9/1995 | Hutter ................... 226/181 X |
| 5,540,373 | 7/1996 | Sugizaki et al. ......................... 226/181 |

Primary Examiner—Michael Mansen

[57] ABSTRACT

A pinch roller type tape drive assembly which is one of the elements composing a tape driving system of a VCR and ensures stable running of a tape. The pinch roller type tape drive assembly has a capstan for rotating at a constant velocity and a pinch roller which self-aligns, for pressing a tape against the capstan so as to drive the tape at the constant velocity together with the capstan. When the pinch roller is pressed against the capstan, an annular self-aligning member disposed between an inner sleeve and an outer sleeve is compressed in the direction of the contact point of the capstan and the pinch roller toward a pinch roller shaft, thereby holding the gap between the capstan and the pinch roller. Accordingly, the tape which is pulled and driven by the capstan and the pinch roller runs in a correct direction,

6 Claims, 3 Drawing Sheets

PINCH ROLLER TYPE TAPE DRIVE ASSEMBLY

BACKGROUND OF THE INVENTION

1. Field of the Invention

The present invention relates to an information recording and reproducing apparatus, such as a video cassette recorder (hereinafter referred to as VCR), and more particularly to a pinch roller type tape drive assembly of an information recording and reproducing apparatus.

2. Description of the Prior Art

In general, an information recording and reproducing apparatus such as a VCR records video signals and audio signals on a magnetic tape which is driven through a driving system or reproduces video signals and audio signals from the magnetic tape. The VCR is divided into three types; β, VHS, and 8 mm according to the width of the tape on which an information is recorded. The tape is would on a supply reel and a take-up reel provided within a cassette. When the cassette is inserted into the cassette inserting port and is mounted on the VCR deck, a tape loading mechanism positions the tape from the cassette to driving position.

The tape wound on the supply reel is drawn by a capstan and a pinch roller so as to be wound on the take-up reel. Three heads are disposed between the supply reel and the take-up reel so that the two heads erase, record, and reproduce signals by making contact with the tape during a driving of the tape. At this time, since the capstan and the pinch roller carry out the driving of the tape in a correct direction, the capstan and pinch roller have to rotate at e constant velocity, otherwise the heads can not record information onto the tape correctly and can not reproduce information recorded onto the tape. Also, the capstan and the pinch roller sustain a force, for example a tape tension which draws the tape, in order to maintain an equilibrium with the supply reel so that the heads can make stable contact witty the tape and thereby damage of the tape can be prevented.

FIG. 1 is a sectional view of a pinch roller type tape drive assembly according to the prior art. The pinch roller type tape drive assembly 100 according to the prior art comprises a capstan 110 which rotates at a constant velocity and a pinch roller 120 for driving a tape at a constant velocity together with capstan 110. Pinch roller 120 comprises a pinch roller shaft 130 for supporting pinch roller 120, a ball bearing 140 rotatably mounted on pinch roller shaft 130, an inner sleeve 150 for enclosing ball bearing 140, and an outer sleeve 160 whose outer surface is coated with an elastic material, and encloses the inner sleeve 150.

As described above, in pinch roller type tape drive assembly 100, capstan 110 and pinch roller 120 pull and drive the tape at a constant velocity. However, since pinch roller 120 is substantially inclined with respect to capstan 110 so that pinch roller 120 does not make parallel contact with capstan 110. there is a problem in that capstan 110 and pinch roller 120 cannot drive the tape in correct direction.

U.S. Pat. No. 5,540,373 (issued to Yasuo Suglzaki on Jul. 30, 1996) discloses a pinch roller type tape drive capable of ensuring the stable running of a magnetic tape. The pinch roller type tape drive according to Sugizaki's patent comprises a capstan for frictionally driving a tape, a pinch roller having a working length which is slightly greater than the width of the tape, the pinch roller pressing the tape against the capstan and having an elastic circumferential member with Shore hardness A of 70 or higher on a circumference of the pinch roller, and a pinch roller pressing means supporting the pinch roller and being capable of pressing the pinch roller against the capstan.

In the pinch roller type tape drive as described above, when the pinch roller presses the tape against the capstan the circumference of the pinch roller is deformed slightly, a gap of a width substantially equal to the thickness of the magnetic tape is formed between the respective circumferences of the pinch roller and the capstan, and the pinch roller and the magnetic tape come in contact with each other along a line. Accordingly, the tape firmly makes contact with the capstan so as that the tape is running in a correct direction. Therefore, the pinch roller type tape drive can be relatively small in size because the length of the pinch roller may be substantially the same as the width of the magnetic tape.

In the pinch roller type tape drive according to Sugizaki's patent, however, there is a problem in that a specific pinch roller pressing means is needed for the pinch roller type tape drive since the pinch roller pressing means presses the pinch roller against the capstan by firmly applying a pressure throughout the length of the pinch roller so that the tape firmly makes contact with the capstan.

SUMMARY OF THE INVENTION

The present invention overcomes the above described problem of the prior art. It is an object of the present invention to provide a pinch roller type tape drive assembly which is capable of driving a tape stably without separate pinch roller pressing members.

To accomplish the above object of the present invention, there is provided a pinch roller type tape drive assembly which comprises:

a capstan which rotates at a constant velocity; and a self aligning pinch roller for pressing a tape against the capstan so as to drive the tape at the constant velocity together with the capstan, the pinch roller comprising a pinch roller shaft, a rotatable bearing, rotatable inserted into the pinch roller shaft for supporting the pinch roller shaft, a cylindrical inner sleeve having a groove formed along an outer peripheral surface thereof and enclosing the bearing, a cylindrical outer sleeve having a groove along an inner peripheral surface thereof which corresponds to the groove formed on the outer peripheral surface of the inner sleeve, having an elastic material coated on an outer peripheral surface thereof, and enclosing the inner sleeve, and an annular self-aligning member disposed between the groove of the inner sleeve and the groove of the outer sleeve, for connecting the inner sleeve to the outer sleeve.

A seal is attached to a lower end of the bearing of the pinch roller so as to prevent a leakage of lubricant flowing along the pinch roller shaft, At least one oil guide groove is formed on the pinch roller shaft so that an oil is supplied to the oil guide groove and lubricates the bearing.

The oil guide groove is helically formed along the pinch roller shaft from an upper portion of the pinch roller shaft to the seal.

The oil guide groove includes a first oil guide groove helically formed along the pinch roller shaft from an upper portion of the pinch roller shaft to the seal, and a second oil guide groove helically formed along the pinch roller shaft in an opposite direction to the first oil guide groove from an upper portion of the pinch roller shaft to the seal, wherein the first oil guide groove and the second oil guide groove intersect each other at intermediates thereof.

The bearing is a metal bearing, and the annular self-aligning member is comprised of an elastic material such as silicon rubber.

In the pinch roller type tape drive assembly as described above, when the tape is loaded into a loading mechanism which in a loading state, the pinch roller presses the tape against the capstan, and drives the tape, and rotates together with the capstan at the constant velocity. At this time, an annular self-aligning member disposed between an inner sleeve and an outer sleeve is compressed in the direction of the contact point of the capstan and the pinch roller toward a pinch roller shaft, thereby maintaining the gap between the capstan and the pinch roller. Accordingly, the tape which is pulled and driven by the capstan and the pinch roller runs in a correct direction.

BRIEF DESCRIPTION OF THE DRAWINGS

The above object and other advantages of the present invention will become more apparent by describing in detail the preferred embodiment thereof with reference to the attached drawings, in which.

DESCRIPTION OF THE PREFERRED EMBODIMENT

Hereinafter, a preferred embodiment of the present invention, will be described in detail with reference to the accompanying drawings.

Figure 1:
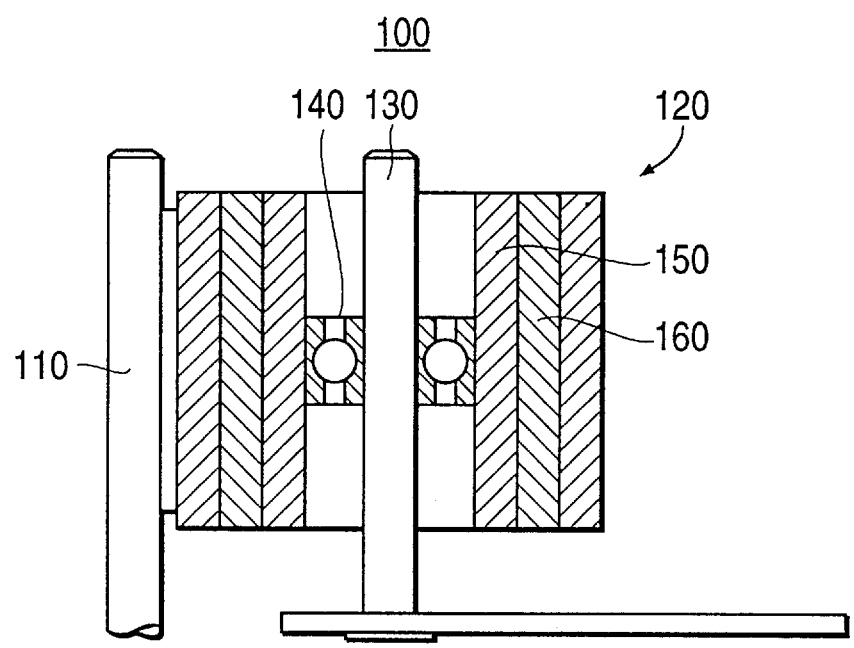
FIG. 1 is a sectional view of a pinch roller type tape drive assembly according to the conventional art.
Figure 2:
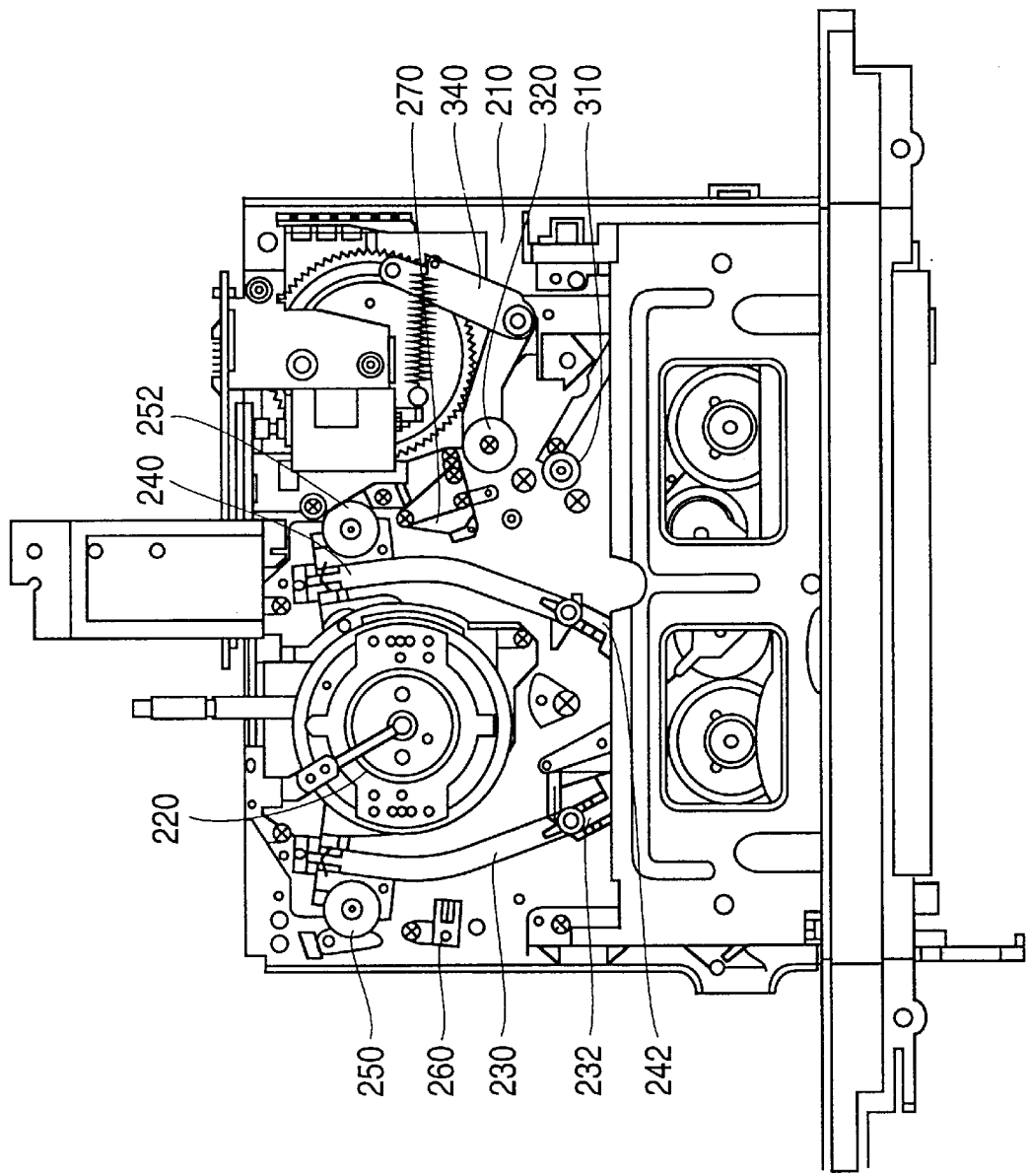
FIG. 2 is a schematic perspective view showing a general drive system of a VCR, to which a pinch roller type tape drive assembly according to the present invention is applied.

FIG. 2 is a schematic perspective view showing a general tape drive system of a VCR, to which a pinch roller type tape drive assembly according to the present invention is applied.

Referring to FIG. 2, a loading mechanism of a video deck that is shown is an M type loading mechanism. An M type loading mechanism is generally applied to VHS type VCR.

Generally, a tape drive system 200 of the VHS type VCR comprise a head drum 220 mounted on a base 210 to the left of the enter portion of base 210, for recording or reproducing information onto or from a tape being driven, a pair of shaft holder guides 230 and 240 respectively arranged at both sides of head drum 220, a pair of shaft holders 232 and 242 slidably disposed on shaft holder guides 230 and 240, respectively, for loading the tape according to loading signal from a controller, a pair of impedance rollers 250 and 212 respectively arranged at an outside of the respective shaft holder guides 230 and 240, for restricting litter due to a vibration of the tape, an erase head 260 for erasing information recorded on the tape, an audio control head 270 for controlling audio signals recorded on the tape, a plurality of posts including a tension lever (not shown) for maintaining a tension of the tape during the running of the tape, and a pinch roller type tape drive assembly for driving die tape at a constant velocity while maintaining the tension of the tape.

Head drum 220 comprises an upper drum and a lower drum. The upper drum has a rotatable body and is disposed on an upper portion of the lower drum, which has a stationary body. A plurality of heads are arranged on a lower portion of the upper drum in such manner that in a two head type VCR, the two heads are disposed on the upper drum at 180° angle, and in a four head type VCR, the four heads are disposed on the upper drum at 90° angle. During a recording or a reproducing mode, the upper dram is rotated by a drive apparatus, for example an electric motor disposed below the tower drum, so that the head record information onto the tape or reproduce information recorded on the tape, respectively. Also, in order to prevent the tape from being scratched due to being in direct contact with head drum 220, something is needed in order to provide a gap between the tape and head drum 220. For this purpose, a plurality of grooves are formed along a peripheral surface of head drum 220, thereby preventing the tape from being in contract with head drum 220.

Shaft holders 232 and 242 are T shaped tables whose respective head portions have a limit post and an inclined post thereon. In the state of unloading the tape after inserting a cassette into VCR deck, shaft holders 232 and 242 are respectively positioned at shaft holder inserting ports of the cassette. In the state of loading the tape according to a control signal of the controller, shaft holders 232 and 242 draw the tape from the cassette and transfer it to head drum 220. In the state of loading the tape completely, each of shaft holder 232 and 242 is positioned behind the front-half of head drum 220, and the-tape loaded by shaft holder 232 and 242 is positioned around the front-half of head drum 220 so that it winds around the peripheral surface of head drum 220 at 180° angle. At a tape entering portion of head drum 220, the inclined post of shaft holder 232 is disposed in a position more adjacent to head drum 220 than the limit post shaft holder 232 is, so the tape is smoothly driven to head drum 220. Also, at a tape exiting portion of head drum 220, the inclined post of shaft holder 242 is disposed in a position more adjacent to head drum 220 than the limit post shaft holder 242 is, so the tape which has passed by head drum 220 is smoothly driven to audio control head 270.

Impedance rollers 250 and 252 are respectively disposed adjacent to shaft holder guides 230 and 240 and restrict jitters due to vibration of the tape.

Erase head 260 is arranged between impedance roller 250, which is positioned at the tape entering portion of head drum 220, and the tension lever and erases video and audio information recorded on the tape which is running.

Audio control head 270 is arranged between impedance roller 252, which is positioned at the tape exiting portion of head drum 220, and pinch roller type tape drive assembly 300 and reproduces audio information recorded on the tape or records audio information onto the tape.

The tape drive system 200 of the VCR also comprises the plurality of posts including the tension lever in order to prevent the tape from hanging down or being deformed. The tension lever is disposed between erase head 260 and the cassette. One end of the tension lever is rotatably connected to base 210 and a tension post is mounted on the other end of the tension lever. Also, a protrusion portion projects outwardly from the middle portion of the tension lever. An extension of a back tension lever (not shown) is rotatably connected to an end of the protrusion portion. A back tension post is mounted on one end of the back tension lever, and the other end of the back tension lever is pivotally connected to the base. The extension of the back tension lever extends from the other end of the back tension lever and connects to the protrusion portion as described above, The pinch roller type tape drive assembly 300 includes a capstan 310 and pinch roller 320, and is disposed between the audio control head 270 and the take-up reel of the VCR.

Figure 3:
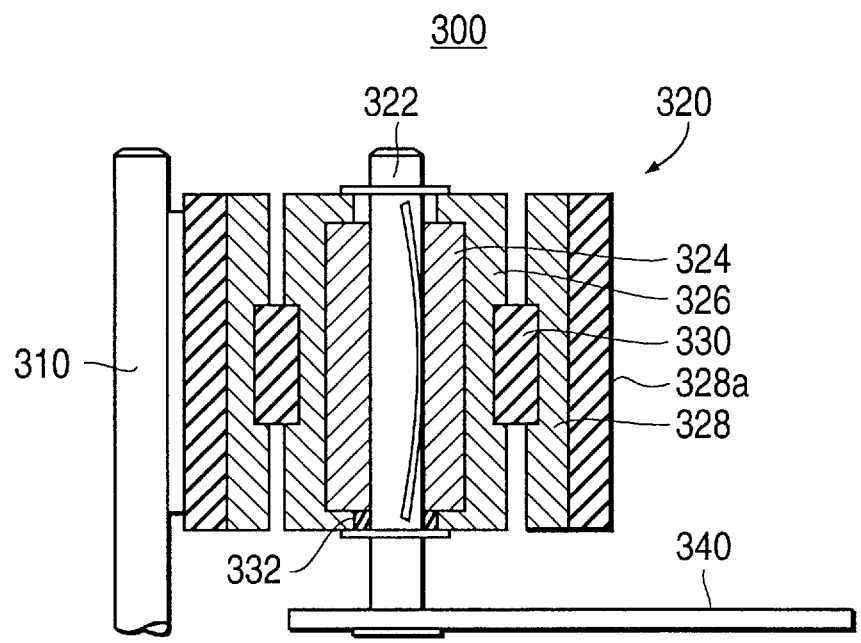
FIG. 3 is a sectional view of the pinch roller type tape drive assembly according to one embodiment of the present invention.
Figure 4:
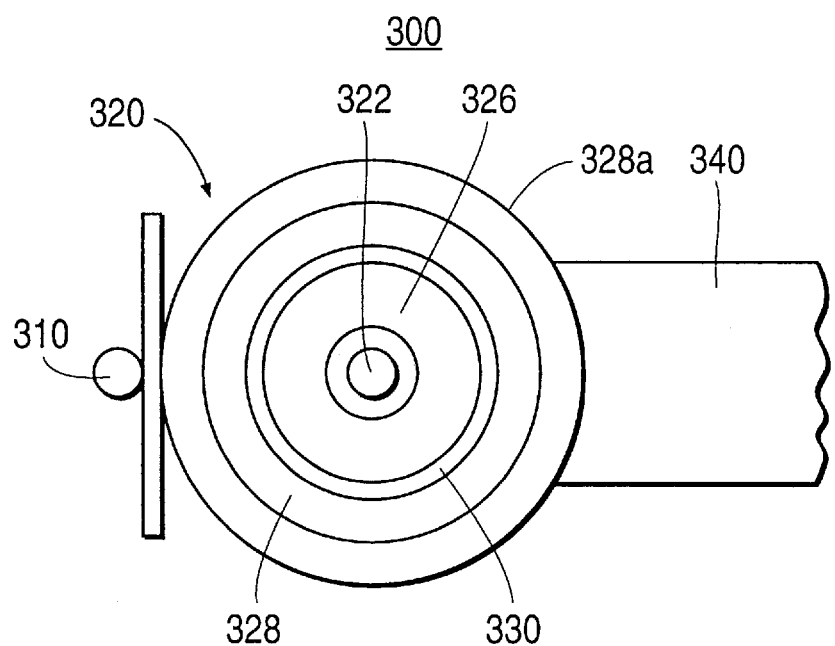
FIG. 4 is a plan view of the pinch roller type tape drive assembly as shown in FIG. 3.

FIG. 3 is a sectional view of the pinch roller type tape drive assembly 300 according to an embodiment of the present invention. FIG. 4 is a plan view of the pinch roller type tape drive assembly 300 according to the embodiment of the present invention.

Referring to FIGS. 3 and 4, the pinch roller type tape drive assembly 300 in accordance with the embodiment of the present invention includes capstan 310 which rotates at a constant velocity, pinch roller 320 for pressing a tape against capstan 310 so as to drive the tape at the constant velocity together with capstan 310, and pinch roller lever 340 for supporting pinch roller 320 and pressing pinch roller 320 against capstan 310.

Capstan 310 is rotatably assembled to base 210 of the VCR deck, and one end of capstan 310 extends through base 210 and is associated with a driven pulley or a driven gear so that power is transmitted from a capstan drive motor (not shown) to capstan 310.

Pinch roller 320 comprises a pinch roller shaft 322, a rotatably bearing 324 inserted into pinch roller shaft 322 for supporting pinch roller shaft 322, a cylindrical inner sleeve 326 having a groove formed along an outer peripheral surface thereof and enclosing bearing 324, a cylindrical outer sleeve 328 having a groove along an inner peripheral surface thereof, the groove which corresponds to the groove formed on the outer peripheral surface of inner sleeve 326, having an elastic member coated on an outer peripheral surface thereof, and enclosing inner sleeve 326, and an annular self-aligning member 330 disposed between the groove of inner sleeve 326 and the groove of outer sleeve 328 for connecting inner sleeve 326 to outer sleeve 328.

A seal 332 for sealing oil is attached to a lower end of bearing 324 in pinch roller 320. Seal 332 prevents a lubricant oil provided between pinch roller shaft 322 and bearing 324 from flowing down along pinch roller shaft 320 and leaking out. Also, seal 332 stores the lubricant oil flowing down along pinch roller shaft 322 in a chamber between the lower end of bearing 324 and seal 332.

Even though a solid shaft can be used as pinch roller shaft 322, an oil guide groove can be formed on pinch roller shaft 322 in order to provide oil for lubrication of bearing 324 so that pinch roller 320 can be smoothly rotated. The oil guide groove is formed on a peripheral surface of one half of pinch roller shaft 322 opposite to a peripheral surface of another half of pinch roller shaft 322 facing capstan 310 when pinch roller 320 is pressed against capstan 310. The oil guide groove is helically formed along pinch roller shaft 322 from the upper portion of pinch roller shaft 322 to seal 332, and has an angle range of 180°. By forming the oil guide groove on pinch roller sat 322 in the manner described above, oil which is collected by the seal during a non-operation state of the VCR is moved along the oil guide groove of pinch roller shaft 322 due to the rotation of pinch roller 320 while lubricating bearing 324.

Also, a first oil guide goove can be helically formed along pinch roller shaft 322 from the upper portion of pinch roller shaft 322 to seal 332, and a second oil guide groove can be helically formed along pinch roller shaft 322 in an opposite direction to the first oil guide groove from the upper portion of pinch roller shaft 322 to seal 332. The first oil guide groove and the second oil guide groove intersect each other at the intermediate portions of the grooves. In the case of forming two oil guide grooves, when pinch roller 320 is pressed against capstan 310 in the manner described above, the oil guide grooves are helically formed along pinch roller shaft 322 from the upper portion of pinch roller shaft 322 to seal 332, and has an angle range of 180°.

Bearing 324 is a metal bearing. An oil containing bearing can also be used.

An annular self-aligning member 330 is manufactured from an elastic material, such as silicon rubber, and is arranged between inner sleeve 326 and outer sleeve 328. In the recording or reproducing mode, pinch roller 320 is pressed against capstan 310 so that pinch roller 320 rotates together with capstan 310 while the tape is being driven. However, while driving the tape, pinch roller 320 can be pressed against capstan 310 while pinch roller 320 is inclined. In this state, if a portion of pinch roller 320 is subject to pressure annular self-aligning member 330 absorbs the pressure and is compressed so that pinch roller 320 is uniformly pressed against capstan 310.

Inner sleeve 326 has a cylindrical shape, has flange respectively formed at an upper end and a lower end thereof, and has a groove formed along an outer peripheral surface at an intermediate portion thereof. Bearing 324 is inserted inside inner sleeve 326, and an inner part of annular self-aligning member 330 is inserted into the groove formed on the outer peripheral surface of inner sleeve 326. Inner sleeve 326 is manufactured by die-casting an aluminum alloy. When manufacturing inner sleeve 326, the lower flange of inner sleeve 326 is formed simultaneously. After bearing 324 is inserted inside inner sleeve 326, the upper end of inner sleeve 326 is bent inwardly to form the upper flange.

Outer sleeve 328 also has a cylindrical shape, has a groove formed along an inner peripheral surface thereof which corresponds to the groove formed on the outer peripheral surface of inner sleeve 326. An cuter portion of annular self-aligning member 330 is inserted into the groove formed on the inner peripheral surface of outer sleeve 328. The outer peripheral surface of outer sleeve 328 is coated with an elastic material 328a, such as rubber.

An inner diameter of outer sleeve 328 is larger than an outer diameter of inner sleeve 326, and a depth of annular self-aligning member 330 is equal to the sum of depths of grooves formed on inner sleeve 326 and outer sleeve 328 plus the difference between the outer diameter of inner sleeve 326 and the inner diameter of outer sleeve 328.

Each element of pinch roller 320 formed as described above is assembled as follows. First of all, after bearing 324 is inserted into inner sleeve 326 in the manner described above, bearing 324 is integrally assembled with inner sleeve 326 by bending he upper end of inner sleeve 326 inwardly to form the upper flange thereof. Then, after the inner part of annular self-aligning member 330 is inserted into the groove formed on the outer peripheral surface of inner sleeve 326, inner sleeve 326 is inserted into outer sleeve 328 in such a manner that the outer portion of annular self-aligning member 330 is inserted into the groove formed on the inner peripheral surface of outer sleeve 328. Accordingly, the assembling of pinch roller 320 is completed by inserting pinch roller shaft 322 into bearing 324.

Hereinafter, the operation of each of the elements of the pinch roller type tape drive assembly of the present invention will be described.

Capstan 310 and pinch roller 320 are elements for driving the tape at the constant velocity in the driving system of VCR. In the recording and the reproducing modes, pinch roller 320 presses the tape against capstan 310. At this time, pinch roller 320 does not make parallel contact with capstan 310, but makes contact with capstan 310 while pinch roller 320 is inclined. When the tape is driven in the state as described above, the tape cannot be driven in a correct direction, and also the tape may be deformed. When pinch roller 320 according to the present invention is in contact with capstan 310 while pinch roller 320 is inclined, annular elastic member 330 absorbs the pressure applied to pinch roller 320 by pinch roller lever 340 by becoming compressed so that pinch roller 320 is uniformly pressed against capstan 310. Accordingly, pinch roller 320 can rotate together with capstan 310 at the constant velocity and in the correct direction.

While the present invention has been particularly shown and described with reference to a particular embodiment thereof, it will be understood by those skilled in the art that various changes in form and detail may be effected therein without departing from the spirit and scope of the invention as defined by the appended claims.

What is claimed is:

1. A pinch roller type tape drive assembly comprising:
   a capstan which rotates at a constant velocity; and
   a self-aligning pinch roller for pressing a tape against said capstan so as to drive said tape at said constant velocity together with said capstan, said pinch roller comprising
      a pinch roller shaft,
      a bearing rotatably mounted onto said pinch roller shaft,
      a cylindrical inner sleeve having a first groove formed along an outer peripheral surface of the cylindrical inner sleeve, and enclosing said bearing,
      a cylindrical outer sleeve, having a second groove formed along an inner peripheral surface of the cylindrical outer sleeve corresponding to said first groove, having an elastic material coated on an outer peripheral surface of the cylindrical outer sleeve, and enclosing said cylindrical inner sleeve, and
      an annular self-aligning member disposed between said first groove and said second groove, for connecting said cylindrical inner sleeve to said cylindrical outer sleeve.

2. A pinch roller type tape drive assembly as claimed in claim 1, further comprising a seal attached to a lower end of said bearing so as to prevent leakage of lubricant oil, provided between said pinch roller shaft and said bearing, from flowing down along said pinch roller shaft and leaking out of said self-aligning pinch roller.

3. A pinch roller type tape drive assembly as claimed in claim 1, wherein at least one oil guide groove is formed on said pinch roller shaft so that when a lubricant oil is supplied to said at least one oil guide groove, said lubricant oil lubricates said bearing.

4. A pinch roller type tape drive assembly as claimed in claim 3, wherein said at least one oil guide groove is helically formed along said pinch roller shaft from an upper portion of said pinch roller shaft to said seal.

5. A pinch roller type tape drive assembly as claimed in claim 3, wherein said at least oil guide groove includes a first oil guide groove helically formed along said pinch roller shaft from an upper portion of said pinch roller shaft to said seal, and a second oil guide groove helically formed, in an opposite direction to said first oil guide groove, along said pinch roller shaft from an upper portion of said pinch roller shaft to said seal, and wherein said first oil guide groove and said second oil guide groove intersect each other at intermediates thereof.

6. A pinch roller type tape assembly as claimed in claim 1, wherein said annular self-aligning member is comprised of an elastic material.

* * * * *